Nov. 17, 1925.

S. A. LUKASZEWICZ

PISTON RING

Filed Aug. 18, 1922

1,562,033

Inventor
Stanley A. Lukaszewicz

By

Attorney

Patented Nov. 17, 1925.

1,562,033

UNITED STATES PATENT OFFICE.

STANLEY A. LUKASZEWICZ, OF SOUTH MILWAUKEE, WISCONSIN, ASSIGNOR OF ONE-HALF TO STEVEN S. LUKASZEWICZ, OF MILWAUKEE, WISCONSIN.

PISTON RING.

Application filed August 18, 1922. Serial No. 582,628.

*To all whom it may concern:*

Be it known that I, STANLEY A. LUKASZEWICZ, a citizen of the United States, and resident of South Milwaukee, in the county of Milwaukee and State of Wisconsin, have invented certain new and useful Improvements in Piston Rings; and I do hereby declare that the following is a full, clear, and exact description thereof.

This invention relates to a piston ring.

It is an object of this invention to provide a piston ring with positive acting means for insuring that contact will be maintained between the ring and the cylinder within which it moves.

Another object of the invention is to provide a ring which will at all times be in constant contact with the side wall of the piston ring groove.

It is still another object of my invention to provide a piston ring having a wearing surface of suitable metal and slight resiliency and means possessing greater resiliency mounted within the piston ring adapted to produce an outward pressure upon the wearing rings or ring.

It is still another object of my invention to provide a simple and cheaply manufactured ring of the character described in which it has not only an opening extending entirely through the ring and expansible circumferentially, but which is also expansible in the direction of the longitudinal axis of the piston, thus maintaining a tight joint in the piston ring groove which eliminates knocking of the ring in the piston groove and also prevents leakage around the base of the ring or rings within the groove.

Other objects will be apparent as the description proceeds and my invention is illustrated in the accompanying drawings, in which:

Figure 2 is a modified view of the rings above referred to.

Figure 1:
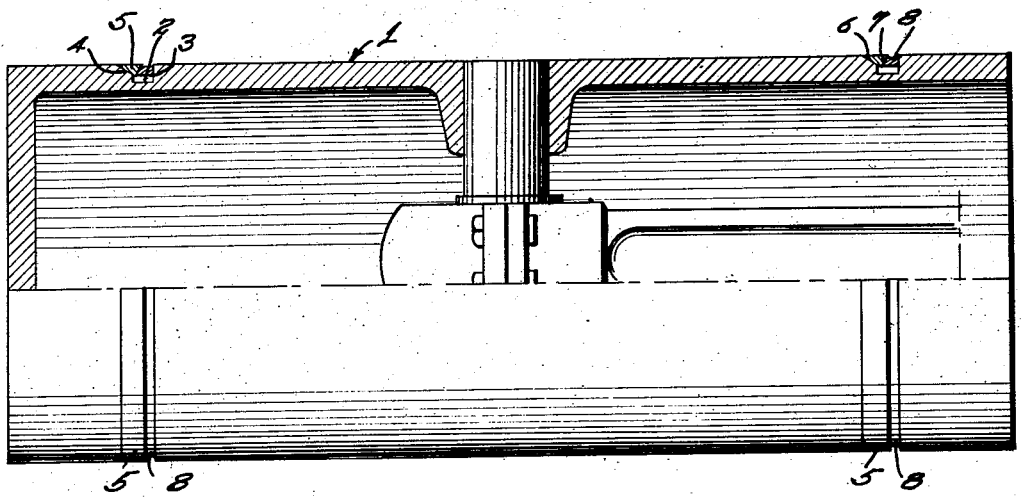
Figure 1 is a side view of a piston head partly in section showing mounted therein my improved rings.
Figure 2:
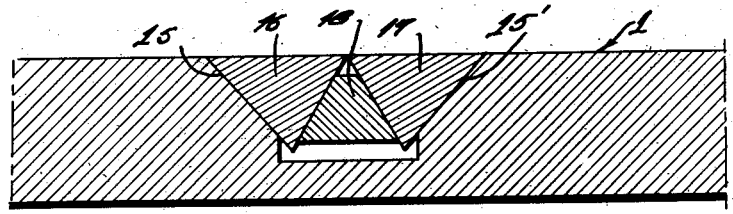

Referring to the drawings in detail, the numeral 1 designates a piston head of usual structure having arranged therein adjacent its end portions the annular grooves 2 each of which have a side wall 3 extending perpendicularly to the base of the groove 2 and inclined wall 4, the latter inclining upwardly from a point adjacent the base of the groove 2.

The groove 2 has arranged therein suitable packing rings and in that shown in the drawings I have provided an outer split wearing ring 5 which has an inclined face 6 coacting with the side wall 4 of the groove 2. The ring 5 is provided with a second inclined face 7, the angle of which is greater than that of the face 6, and coacting with this latter face is a second split ring 8 the other face of which bears against the perpendicular wall 3 of the groove 2.

It will be noted that in the structure herein above referred to that when the ring 8 expands outwardly the coaction of the inclined faces between the two rings will cause the wearing ring to be forced up the inclined wall 4, thus always insuring a tight joint between the wearing ring and the piston groove wall. The wearing ring 5 is further forced into contact with the walls of the cylinder thus preventing any leakage of oil or gas between the piston to the wall. Furthermore, by the structure referred to the passage of gas or oil through the piston groove is entirely eliminated.

Referring to that structure disclosed in the modified form I have provided a ring having the same characteristics as that previously referred to with the exception that both walls of the groove arranged within the piston are inclined, as indicated at 15 and 15'. Within this groove is arranged two rings 16 and 17 each of which are similar to the ring 5 referred to in the preferred form. These rings 16 and 17 have placed between them the split expansion ring 18 formed with inclined faces which are adapted to engage corresponding faces formed on the rings 15 and 15'.

By this structure it will be noted that as the ring 18 tends to expand the rings 16 and 17 are forced outwardly against the cylinder wall and upward of the inclined wall 15 and 15', thus insuring a tight joint between the ring and the cylinder wall and piston.

Furthermore, it will be apparent for the structure, herein referred to that in order to insure a proper fit of the rings with the groove, the ring or rings having the inclined wall may be ground in place.

It is well understood that while the invention has been described and illustrated in very specific terms in detail construction and arrangement, various changes in the several parts of the same, or the manner of their assemblage and application may be resorted to without departing from the spirit and scope of my invention.

Further attention is directed to the fact that the foregoing structure tends to firmly hold, both the top and bottom of the piston, within the cylinder, thereby eliminating all tendency of the piston to slap against the wall of the cylinder.

Having thus fully described my invention what I claim as new is:

A piston having therein an annular groove adapted to receive therein packing, both side walls of said groove being partly inclined outwardly with respect to each other and the remaining portion of each wall being perpendicular to the base of the groove, a pair of split contractible rings positioned within said groove and coacting with the inclined portions of the side walls and provided with adjacent inclined faces which are of a greater angle than the first said inclined faces, and a split expansion ring arranged within the base portion of the groove and having its outer face provided with converging inclined faces adapted to coact with the adjacent faces of the contractible rings for forcing said rings upwardly of said inclined walls and outwardly in contact with the cylinder wall.

In testimony that I claim the foregoing I have hereunto set my hand at Milwaukee, in the county of Milwaukee and State of Wisconsin.

STANLEY A. LUKASZEWICZ.